United States Patent
Boron et al.

(10) Patent No.: US 11,290,824 B2
(45) Date of Patent: Mar. 29, 2022

(54) SPEAKER ASSEMBLY

(71) Applicant: Aptiv Technologies Limited, St. Michael (BB)

(72) Inventors: Artur Boron, Czernichów (PL); Grzegorz Szostek, Morawica (PL)

(73) Assignee: Aptiv Technologies Limited, St. Michael (BB)

( * ) Notice: Subject to any disclaimer, the term of this patent is extended or adjusted under 35 U.S.C. 154(b) by 79 days.

(21) Appl. No.: 16/660,115

(22) Filed: Oct. 22, 2019

(65) Prior Publication Data

US 2020/0137499 A1   Apr. 30, 2020

(30) Foreign Application Priority Data

Oct. 31, 2018   (EP) ..................... 18203767

(51) Int. Cl.
   *H04R 25/00* (2006.01)
   *H04R 9/06* (2006.01)
   *H04R 7/12* (2006.01)
   *H04R 9/04* (2006.01)

(52) U.S. Cl.
   CPC ............... *H04R 9/06* (2013.01); *H04R 7/127* (2013.01); *H04R 9/046* (2013.01)

(58) Field of Classification Search
   CPC .......... H04R 7/127; H04R 9/046; H04R 9/06; H04R 1/025; B60R 11/0217
   USPC .......................................... 381/400
   See application file for complete search history.

(56) References Cited

U.S. PATENT DOCUMENTS

| | | | | |
|---|---|---|---|---|
| 6,128,385 A | * | 10/2000 | Goyal | ............... H04M 1/03 379/433.01 |
| 2004/0240698 A1 | | 12/2004 | Eaton | |
| 2006/0094378 A1 | | 5/2006 | Murray et al. | |

FOREIGN PATENT DOCUMENTS

| | | |
|---|---|---|
| CN | 1450772 | 10/2003 |
| CN | 205249477 | 5/2016 |
| DE | 10256970 A1 | 6/2004 |
| EP | 0 281 084 A2 | 9/1988 |
| JP | 2005064796 | 3/2005 |

(Continued)

OTHER PUBLICATIONS

"Foreign Office Action", CN Application No. 201911016987.5, dated Sep. 30, 2020, 18 pages.

(Continued)

*Primary Examiner* — Phylesha Dabney
(74) *Attorney, Agent, or Firm* — Sawtooth Patent Group PLLC

(57) ABSTRACT

The invention relates to a speaker assembly. In order to enable a cost-effective assembly of an electronic device with a speaker, the invention provides that the speaker assembly comprises:
a base element having a surface, which is at least partially electrically conductive;
a speaker associated with the base element;
a cover element at least partially covering the base element and comprising a receiving section in which the speaker is at least partially received;
a rubber-elastic mounting element interposed between the speaker and the cover element for retaining the speaker in the receiving section; and
at least one connector element electrically connecting the speaker with the base element, which connector element is preloaded between the speaker and the base element.

20 Claims, 2 Drawing Sheets

(56) References Cited

FOREIGN PATENT DOCUMENTS

JP          2005244834 A  *  9/2005
JP           4 357669 B2    11/2009

OTHER PUBLICATIONS

"Foreign Office Action", CN Application No. 201911016987.5, dated May 21, 2021, 17 pages.
"Foreign Office Action", EP Application No. 18203767.1, dated May 11, 2021, 7 pages.
"Foreign Office Action", CN Application No. 201911016987.5, dated Oct. 20, 2021, 14 pages.

* cited by examiner

SPEAKER ASSEMBLY

CROSS-REFERENCE TO RELATED APPLICATION

This application claims the benefit under 35 U.S.C. § 119(a) of European Patent Application EP 18203767.1, filed Oct. 31, 2018, the entire disclosure of which is hereby incorporated herein by reference.

TECHNICAL FIELD

The invention relates to a speaker assembly and to a method for assembling a speaker assembly.

BACKGROUND ART

Today, various electronic devices are equipped with a loudspeaker for sound output. The speaker is normally electrically connected to a printed circuit board (PCB) which comprises other electronic components. However, the assembly of a speaker e.g. in instrument clusters and other modules equipped with speaker brings about considerable technical problems. It is problematic to integrate such an assembly into a production line. Particular problems arise if the speaker has to be assembled into a die cast cover, because the die cast metal does not allow for the creation of elastic clips that could hold the speaker. Presently, there are mainly two solutions to the assembly problem.

According to a first solution, the speaker is connected to the PCB and the electrical connectors of the speaker are soldered onto the PCB. In this case however, the speaker has to withstand a relatively high temperature during soldering, which may affect its reliability. If the PCB is otherwise populated only with surface mounting technology (SMT), the connection of the speaker requires an additional selective soldering process, because the speaker cannot withstand the elevated temperatures of the reflow process of SMT.

In a second solution, the speaker is assembled with the cover of the module. If the cover is die cast, this usually means that the speaker has to be connected by screws. This kind of connection is difficult to integrate into an optimised assembly process and therefore leads to increased costs. Additionally, a cable with a connector is used to electrically connect the speaker to the PCB. Connecting the cable to the speaker requires an additional soldering process, which is usually carried out manually, thereby leading to increased costs. In a further stage of the assembly, the cable has to be connected to the PCB, which has to be done manually and with high precision and the speaker has to be fixed by screws. Sometimes an additional part is required to cover the speaker. If a high sound pressure level (SPL) output is required, and additional sealing can be necessary.

Alternatively, the speaker needs to be equipped with special mounting features, which also increase its cost and thus the costs of the entire device.

Technical Problem

It is thus an object of the present invention to enable a cost-effective assembly of an electronic device with a speaker.

This problem is solved by a speaker assembly according to claim 1 and by a method according to claim 15.

GENERAL DESCRIPTION OF THE INVENTION

The invention provides a speaker assembly. The speaker assembly can e.g. be part of a portable electronic device, an electronic module in a vehicle or any other device that comprises a speaker for sound output.

The speaker assembly comprises a base element having a surface which is at least partially electrically conductive. One could also say that at least a part or a portion of the upper surface is electrically conductive. Normally, the base element is a printed circuit board (PCB). It usually comprises at least one a conductor path, usually a plurality of conductor paths, and a plurality of electronic components, e.g. integrated circuits, resistors, etc., which are mounted on the surface of the PCB and are connected by the conductor paths. In particular, the electronic components can be mounted by surface mounting technology (SMT), although through-hole technology (THT) could also be employed, for example. In this context, the above-mentioned surface which is at least partially conductive may be referred to as the "upper surface", but it should be understood that this is just an arbitrary notion and depending on the use of the speaker assembly, the upper surface could be oriented in any direction with respect to gravity.

A speaker is cooperates with the surface of the base element for its connection, it is e.g. disposed above the base element. Within the scope of the invention, this can be any type of loudspeaker that is adapted to convert an electric signal into sound. Also, the shape and size of the speaker are not limited within the scope of the invention. The shape of the speaker could at least partially be circular, oval or rectangular, for example. The speaker is disposed above the base element, i.e. it is disposed on the side with the upper surface. It could be in direct contact with the upper surface but is usually spaced apart from the upper surface.

The speaker assembly further comprises a cover element which at least partially covers the base element and comprises a receiving section in which the speaker is at least partially received. The cover element could also be simply referred to as a cover. It may be made from metal, plastic or any other suitable material. Its main function is to protect the base element and any devices mounted on the upper surface. Normally, the cover element covers most of the upper surface. It is directly or indirectly connected to the base element by a suitable mechanical connection, e.g. screwing.

The speaker is at least partially, possibly entirely, received in a receiving section of the cover element. In particular, the receiving section may comprise a recess or cavity in which the speaker is at least partially received. To allow for sound from the speaker to be transmitted to the outside of the speaker assembly, the receiving section usually comprises at least one through-hole. In particular, at least a portion of the receiving section may be perforated, i.e. comprising a plurality of through-holes. The receiving section is normally made of the same material as the rest of the cover element, i.e. the cover element is made of a single piece.

At least one rubber-elastic mounting element is interposed between the speaker and the cover element for retaining the speaker in the receiving section. Preferably, the speaker assembly comprises a single mounting element, although it is possible to use a plurality of mounting elements. The respective mounting element is made of a rubber-elastic material, normally rubber or silicone, however any polymer having a rubber like elasticity (namely hyperelasticity) may be used. In particular, the rubber-elastic mounting element may be made from the following materials: EPDM, Rubber, silicone, polyurethane. It is interposed between the speaker and the cover element, i.e. the speaker is—at least in some locations—not in direct contact with the cover element, but the mounting element is disposed in between. The main function of the mounting element is to retain the speaker in the receiving section. In this context, the rubber-elastic properties of the mounting element have several advantages. For example, higher tolerances regarding the dimensions of the speaker, the mounting element and/or the cover element are possible, because they can be compensated by elastic deformation of the mounting element. Also, elastic deformation can be used during assembly for establishing a form-fitting connection between the mounting element on the one hand and the speaker or the cover element on the other hand. Further, elastic deformation can be used to create a preload between the mounting element and the speaker and/or the cover element to create or increase a frictional force that helps to retain the speaker in its position. During assembly, the connection between the speaker and the cover element via the at least one mounting element can be established in an automated assembly process without soldering or screwing. This helps reducing costs and protects the speaker from elevated temperatures. Apart from its function for maintaining the connection between the speaker and the cover element, the mounting element may also help to dampen vibrations originating from the speaker. Depending on the application, transmission of such vibrations to the cover element could be unwanted for acoustic reasons or it could even damage the cover element or other components; this should normally not be a concern with metal covers. Also, as will be explained below, the rubber-elastic mounting element may help to seal a gap between the speaker and the cover element against dust or water.

The speaker assembly also comprises at least one connector element that electrically connects the speaker with the base element. In particular, it may electrically connect the speaker with an electrically conductive portion of the upper surface, e.g. with at least one conductor path on the upper surface. It is understood that the connector element has to be at least partially electrically conductive. Therefore, it is normally at least partially made of metal, although it is conceivable to use other electrically conductive materials, e.g. conductive polymers. It is also understood that the speaker needs two electric connections in order to be operable as part of a current circuit. Therefore, the speaker assembly normally comprises two connector elements. However, it would be possible to use a single connector element which comprises two separate electrical connections.

It shall be appreciated that the respective connector element is preloaded between the speaker and the base element. In other words, a preload or pretension presses the connector element towards the speaker and the base element, respectively. In order to achieve the electrical connection between the speaker and the base element, the connector element may be in direct contact with the speaker and the base element, respectively, or it may be in contact with some interposed (conductive) element, which in turn is in contact with the speaker or the base element, respectively. Either way, the preload maintains the electrical connection between the speaker and the base element. Thus, according to the invention, it is not necessary to apply a permanent connection between the speaker the base element, e.g. by soldering. Normally, the preload originates from a force between the base element and the cover element that is created during the assembly process of the speaker assembly. The flux of force typically runs from the cover element through the at least one mounting element to the speaker and from there through the at least one connector element to the base element. Normally, the preload acts at least partially, possibly exclusively, perpendicular to the upper surface, i.e. vertically.

The preload originates from an elastic deformation of at least one element of the speaker assembly. For example, this could be an elastic deformation of the cover element or the base element. However, any significant deformation of these elements is usually unwanted. Another possibility would be that the at least one mounting element is elastically deformed to create the preload. However, this could potentially involve tolerance issues, because a relatively small deformation of the mounting element could lead to a relatively high preload of the connector element. Therefore, the dimensions of all elements involved would have to comply with relatively low tolerances in order to avoid an excessive preload. Therefore, it is preferred that the preload is mainly associated with a deformation of the at least one connector element itself. Preferably, at least one connector element is a spring that is elastically deformed between the speaker and the base element. As the cover element and the base element are assembled, the spring is deformed, whereby the preload is created. As mentioned before, "between the speaker the base element" does not imply that the spring has to be in direct contact with either of these elements, but there could be at least one additional interposed element. The spring is normally made of metal, e.g. steel or copper alloy, but it could also be made of other suitable materials like conductive polymer. It would also be possible to use a spring with a composite structure, in which one material has elastic properties while being a poor electric conductor, and a second material is electrically conductive while having poor elastic properties. However, such composite materials generally add to the overall cost of the speaker assembly.

In particular, at least one connector element can be a coil spring. Preferably, the centre axis of the coil spring is at an angle of more than 45° with respect to the upper surface. In particular, may be perpendicular to the upper surface. According to a preferred embodiment, the speaker assembly comprises two coil springs as connector elements. During assembly of the cover element with the base element, the respective coil spring is compressed, whereby the preload is generated that is responsible for maintaining the electrical connection between the speaker and the base element.

Preferably, the mounting element form-fittingly engages at least one of the speaker and the cover element. During the assembly process, the mounting element can be elastically deformed in order to move the mounting element and the speaker (or the cover element, respectively) into a relative position where the form-fitting connection is established. This implies that the connection could potentially be undone by elastic deformation of the mounting element. This can also be beneficial if e.g. the speaker has to be replaced at some time during the lifespan of the speaker assembly. Alternatively or in addition to a form-fitting connection, the mounting element can be connected to the speaker and/or the cover element by friction. As mentioned above, elastic deformation of the mounting element can help to increase frictional forces.

According to a preferred embodiment, the receiving section comprises a sidewall section (e.g. extending vertically), which is at least partially disposed laterally of the speaker, the sidewall section being closed at one end by an end section (extending horizontally) and open at the other end towards the base element. The speaker is arranged to face the end section. In this embodiment, the receiving section may protrude relative to the surrounding parts of the cover element. Again, the terms "horizontal" and "vertical" are to be understood with respect to the upper surface, wherein "horizontal" means parallel to the upper surface, while "vertical" means perpendicular to the upper surface. The sidewall section is at least partially disposed laterally of the speaker. In particular, it may be disposed circumferentially around the speaker. It extends vertically, but does not have to be parallel to the vertical direction. The top section extends horizontally and may in particular be parallel to the horizontal direction. Normally, the sidewall section is directly connected to the top section. The top section and the sidewall section define or delimit a cavity of the receiving section. According to one embodiment, the sidewall section is solid while the top section comprises at least one through-hole or aperture to allow for transmission of sound from the speaker to the outside. In particular, the top section can be perforated (a plurality of through holes form a kind of mesh). The overall geometry of the sidewall section and the top section normally corresponds to the geometry of the speaker. For example, if the speaker has a circular geometry, the sidewall section is normally more or less cylindrical and the top section is more or less circular. If the speaker has a rectangular geometry, the sidewall section normally comprises four sidewalls disposed at right angles with respect to each other, while the top section is rectangular.

The mounting element may also help to properly align the at least one connector element with respect to the speaker and the base element. Significant misalignment of the connector element could lead to a loss of the electrical connection between the speaker the base element. Therefore, it is preferred that the mounting element comprises at least one guide section for guiding at least one connector element, which guide section extends from a proximity of the speaker towards the base element. The at least one guide section is advantageously in one piece with the mounting element. Since the speaker is disposed above the base element, the guide section generally extends downwards, but is not necessarily aligned vertically. It extends towards the base element, but not necessarily all the way up to the base element. In other words, a lower end of the guide portion may be spaced apart from the upper surface of the base element. The exact shape and dimensions of the guide section largely depend on the type and dimensions of the connector element. In particular, the guide section can guide the contact element horizontally, i.e. parallel to the upper surface, thus preventing or at least minimising unwanted movement of the contact element along the upper surface. If there is more than one connector element, there may be one guide section for each connector element.

In particular, at least one guide section can be tubular and at least one connector element can be received in the guide section. This embodiment may be combined with the above-mentioned embodiment where at least one connector element is a coil spring. Corresponding to the overall shape of the coil spring, the guide section may have a circular inner cross-section.

In embodiments, the mounting element comprises a collar section circumferentially disposed around the speaker. The shape of the collar section may generally correspond to the shape of the speaker and/or the shape of the receiving section. For example, if the speaker has a circular shape, the collar section normally has a circular cross-section. The shape of the collar section may be annular. If the speaker, however, has a different shape, the cross-section of the collar section can be adapted accordingly. The collar section is disposed circumferentially around the speaker, i.e. it surrounds the speaker laterally (i.e. in the horizontal plane). If the cover element comprises a sidewall section as described above, the collar section may at least partially be in contact with the sidewall section. Also, it may at least partially be spaced apart from the sidewall section.

In order to provide a form-fitting connection between the speaker and the mounting element, the mounting element preferably comprises at least two inner flanges projecting inwards from the collar section, wherein an outer rim of the speaker is received between a first inner flange and a second inner flange. The first and second inner flange may also be referred to as an upper and lower inner flange, respectively. The outer rim of the speaker is received along the vertical direction between the first (upper) inner flange and the second (lower) inner flange. In other words, the two flanges provide a form-fitting connection with the speaker. Thus, even without any frictional forces—which may be present, though—the speaker is prevented from losing the connection to the mounting element. Optionally, the first flange may be in contact with an underside of the above-mentioned top portion of the cover element.

In order to provide an enhanced sealing effect, thereby preferably preventing any liquid from reaching the base element, the mounting element preferably comprises at least one annular outer flange projecting outwards from the collar section and sealingly engaging the sidewall section. This outer flange may also be referred to as a lip or sealing lip. Normally, the dimensions of the collar section and the at least one outer flange are adapted to the dimensions of the sidewall section so that a (minimal) elastic deformation of the outer flange occurs when the mounting element is inserted into the receiving section. This elastic deformation enhances the sealing effect. The at least one outer flange is normally disposed circumferentially around the collar section.

In embodiments, the cover comprises at least one projecting retainer element that form-fittingly engages the mounting element. The mounting element may comprise a recess that engages the retainer element. Alternatively, a lower edge of the mounting element may engage the retainer element. Either way, the retainer element establishes a form-fitting connection between the cover element and the mounting element. The at least one retainer element may project inwards from the sidewall section. To facilitate the assembly process, the retainer element may comprise a lower slanted surface. During assembly, the mounting element slides along the slanted surface and is elastically deformed as it moves to its intended position. In order to prevent the mounting element from moving out of this position, and upper surface of the retainer element may be horizontal.

According to a preferred embodiment, the mounting element is form-fittingly held between the end section and the at least one retainer element. In particular, an upper part of the mounting element (e.g. the above-mentioned first inner flange) may be in contact with the end section, while a lower part or a lower edge of the mounting element may be in contact with the at least one retainer element.

As mentioned above, the speaker may have a circular shape. This, in general, could bear the risk that the speaker rotates within the mounting element, which could lead to a misalignment between the speaker and the at least one connector element. In embodiments, this can be prevented in that the speaker comprises at least one contact element in electrical contact with a connector element, which contact element form-fittingly engages the mounting element to prevent rotation of the speaker with respect to the mounting element. For instance, the at least one contact element may protrude from the lower surface of the speaker and engage into the guide section. Another possibility is to provide positioning means (rib, tab, recesses, etc.) in the mounting element that cooperate with dedicated portions of the speaker or speaker terminals.

Since the at least one connector element is not connected to the base element by soldering, a certain amount of movement of the connector element with respect to the base element may occur. This, in turn, leads to rubbing that could damage a conductor path on the upper surface. In order to prevent this, at least one conductive buffer element may be disposed between a connector element and a conductor path of the base element. Such a conductive buffer element is normally made of metal and is designed to be more wear resistant than the underlying conductor path and/or it may have a greater thickness than the conductor path, wherefore it is not so much affected by wear. In order to prevent the buffer element from moving with respect to the conductor path, it may be connected thereto by soldering, e.g. as part of an SMT process.

The invention further provides a method for assembling a speaker assembly. In a first step of the method, a base element having an upper surface which is at least partially electrically conductive, a cover element, a speaker, at least one rubber-elastic mounting element and at least one connector element are provided. These terms have been mentioned in context with the inventive speaker assembly and therefore will not be explained again. In another step of the method, the cover element, the at least one mounting element and the speaker are assembled to form a sub-assembly so that the speaker is at least partially received in a receiving section of the cover element and at least one mounting element interposed between the speaker and the cover element for retaining the speaker in the receiving section. In yet another step of the method, the sub-assembly, the at least one connector element and the base element are assembled so that the speaker is disposed above the base element, the cover element at least partially covers the base element from above and the at least one connector element electrically connects the speaker with the base element and is preloaded between the speaker and the base element.

Preferred embodiments of the inventive method correspond to those of the inventive speaker assembly.

BRIEF DESCRIPTION OF THE DRAWINGS

Embodiments of the invention will now be described, by way of example, with reference to the accompanying drawings, in which.

DESCRIPTION OF PREFERRED EMBODIMENTS

Figure 1:
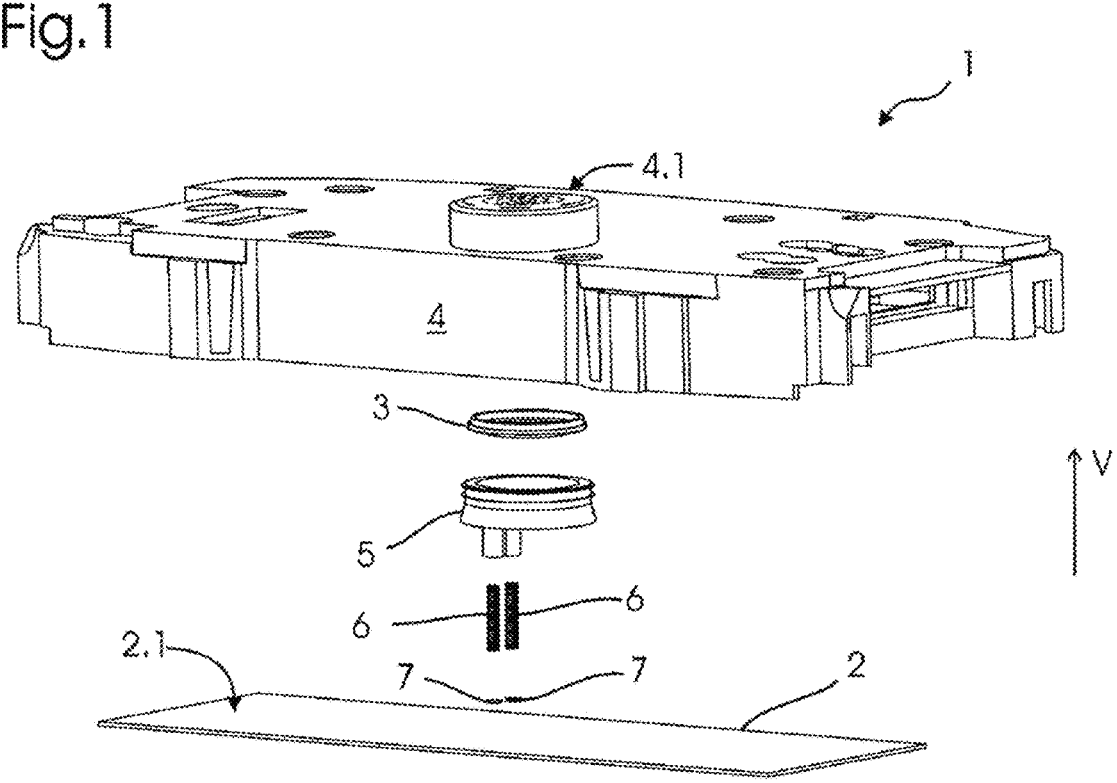
FIG. 1 is an exploded view of an inventive speaker assembly.

FIGS. 1 to 4 show a speaker assembly 1 according to an embodiment of the present invention. FIG. 1 is an exploded view of the speaker assembly 1. It comprises a PCB 2 as a base element. The PCB 2 is shown in a simplified way as a rectangular plate. In reality, a plurality of conductor paths and electronic components, including integrated circuits, are disposed on an upper surface 2.1 of the PCB 2. In particular, these elements, which are not shown here for sake of simplicity, may be mounted on the PCB 2 by surface mounting technology (SMT). In this context, in reference to the drawings, the plane along which the PCB 2 is aligned is defined as the horizontal plane, which also defines a vertical direction V perpendicular to the upper surface 2.1 of the PCB 2. In the assembled state, the PCB 2 is covered by a cover 4 that can be made of die cast metal or plastic. A speaker 3 having a circular shape is mounted above the upper surface 2.1 and is received in a receiving section 4.1 of the cover 4, or more specifically, in a cavity 4.10 of the receiving section 4.1. The cavity 4.10 is delimited by a horizontally extending top section 4.2 and a vertically extending sidewall section 4.3.

Figure 2:
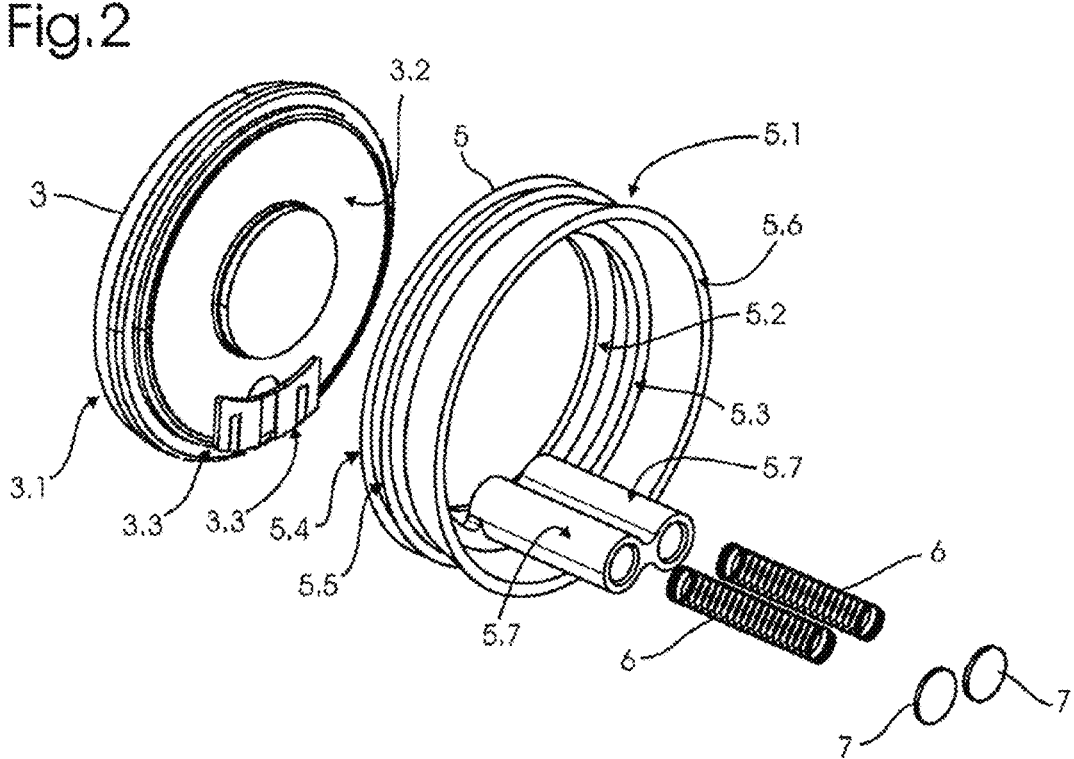
FIG. 2 is an exploded view of a part of the speaker assembly of FIG. 1.
Figure 3:
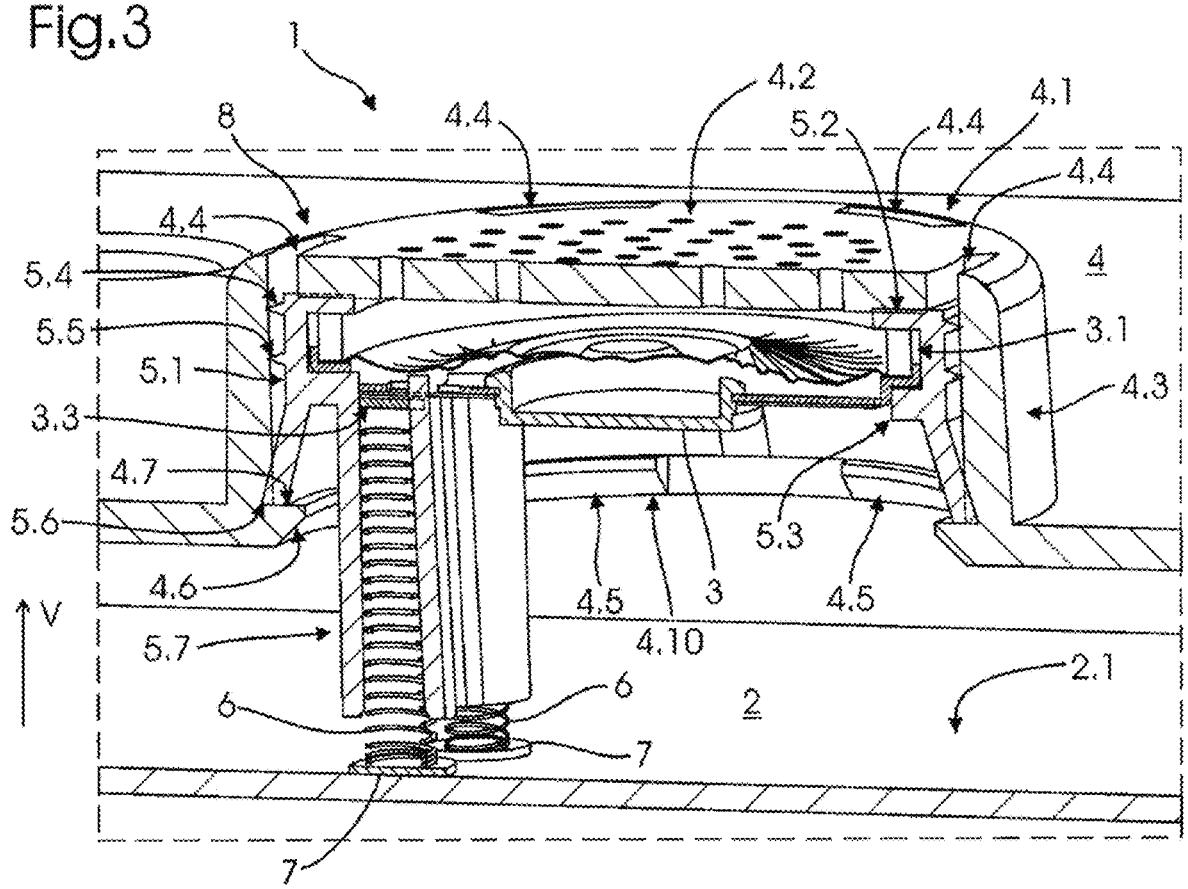
FIG. 3 is a sectional view of the speaker assembly of FIG. 1.
Figure 4:
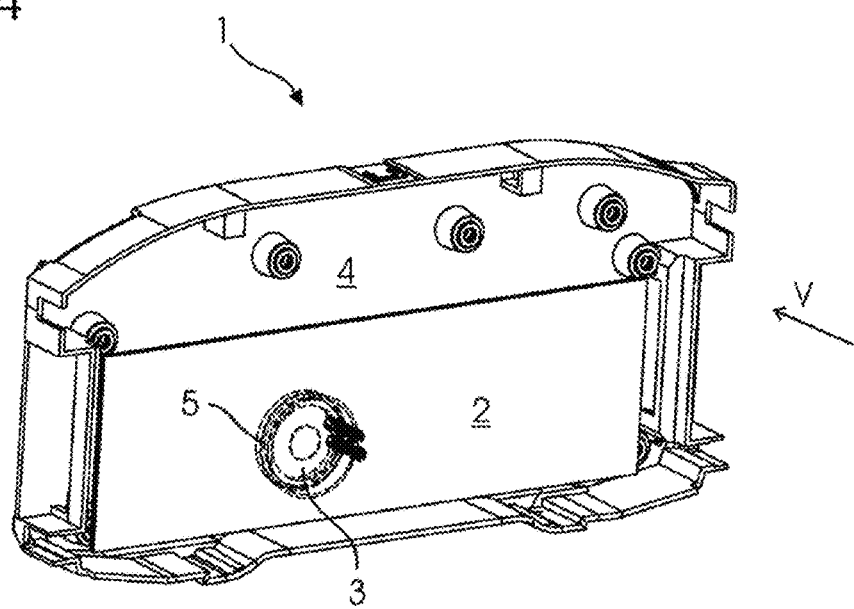
FIG. 4 is a perspective underside view of the speaker assembly of FIG. 1.

In order to provide for a reliable connection between the speaker 3 and the cover 4, a mounting element 5 made of rubber (or rubber-like material) is interposed between the speaker 3 and the receiving section 4.1. The mounting element 5 comprises an annular collar section 5.1 which circumferentially surrounds the speaker 3 in a horizontal direction. As can be seen in FIG. 2 and FIG. 3, an upper inner flange 5.2 and a lower inner flange 5.3 project inwards from the collar section 5.1. An outer rim 3.1 of the speaker 3 is form-fittingly held between the inner flanges 5.2, 5.3. The upper inner flange 5.2 is in contact with the top section 4.2 of the receiving section 4.1, while a lower edge 5.6 of the collar section 5.1 engages a plurality of retainer elements 4.5 that are disposed in a lower part of the receiving section 4.1. Therefore, the mounting element 5 is form-fittingly received with respect to the vertical direction V.

During the assembly process of the speaker assembly 1, the speaker 3 is inserted into the mounting element 5 under elastic deformation of the upper inner flange 5.2, before the mounting element 5 with the speaker 3 is inserted into the cavity 4.10 of the receiving section 4.1. The lower edge 5.6 of the collar section 5.1 moves past the retainer elements 4.4 under elastic deformation. This process is facilitated by a lower surface 4.6 of each retainer element 4.4, which is slanted with respect to the horizontal plane. An upper surface 4.7 of each retainer element 4.4, on the other hand, is parallel to the horizontal plane (or to the upper surface 2.1 of the PCB 2), which prevents the lower edge 5.6 from moving downwards past the retainer elements 4.4. Therefore, the mounting element 5 is prevented from falling out of the receiving section 4.1.

During the assembly process, the speaker 3, the cover 4 and the mounting element 5 can be assembled to form a subassembly 8 of the speaker assembly 1 before the cover 4 is assembled with the PCB 2. In order to provide an electrical connection between the speaker 3 and conductor paths on the upper surface 2.1 of the PCB 2, the speaker assembly 1 also comprises two coil springs 6, which serve as connector elements. These springs 6 can be made of any suitable metal or alloy that is sufficiently elastic and is at the same time electrically conductive. For example, a suitable copper alloy could be used. Each coil spring 6 is received in a guide section 5.7 of the mounting element 5. Each guide section 5.7 is tubular (with circular cross-section) and extends from the proximity of the speaker 3 vertically down towards the upper surface 2.1 of the PCB 2. Each spring 6 is laterally, i.e. horizontally, guided within the respective guide section 5.7.

The springs 6 are placed in the guide sections 5.7 before the subassembly 8 is assembled with the PCB 2. When the cover 4 is connected to the PCB 2, e.g. by screwing, the coil springs 6 are compressed between the PCB 2 and the speaker 3, i.e. they are preloaded. The direction of the respective preload corresponds to the vertical direction V. During operation of the speaker assembly 3, the coil springs 6 may undergo a certain amount of movement, which could lead to friction that could damage the upper surface 2.1 of the PCB 2. In order to prevent this, a small metal disc 7 is placed under each coil spring 6. Each metal disc 7 serves as a conductive buffer element that protects an underlying conductor path. The metal discs 7 can be soldered to the PCB in a SMT process.

As can best be seen in FIG. 3, the top section 4.2 of the cover 4 comprises a plurality of through-holes 4.5 to allow for transmission of sound from the speaker 3 to the outside of the speaker assembly 1. In order to prevent water or other liquids from reaching the inside of the speaker assembly 1, thereby possibly damaging the PCB 2, a first and second outer flange 5.4, 5.5 protrude outwards from the collar section 5.1 and sealingly engage the inside of the sidewall section 4.3. Therefore, the speaker assembly 1 can be part of an IP68 compliant device (i.e. it can be dust tight and resistant to immersion up to 1 m depth). As can be seen in FIG. 3, most of the collar section 5.1 is spaced apart from the sidewall section 4.3, while only the outer flanges 5.4, 5.5 and a portion at the lower edge 5.6 are in contact with the sidewall section 4.3. This also helps to facilitate introduction of the mounting element 5 into the cavity 4.10 of the receiving section 4.1 since the friction is reduced.

The speaker 3, which has, in general, a circular cross-section comprises two contact elements 3.3 on its underside 3.2, which are in contact with the coil springs 6 to provide the electrical connection with the PCB 2. These contact elements 3.3 protrude from the underside 3.2 and engage the mounting element 5. Since they have no rotational symmetry like the rest of the speaker 3, they establish a form-fit with the mounting element 5 that prevents the speaker 3 from rotating and losing the electrical connection to the coil springs 6. In practice, the cover 4 is closed by a rear plate (not sown) that will thus close the open rear side of the cover 4 (facing the second side of PCB 2—opposite side 2.1. It remains to be noted that whereas the above speaker assembly 1 has been described in an application as speaker module for an instrument cluster of an automotive vehicle, the present speaker assembly can be used in a variety of applications and all sorts of configurations, whatever the shape of the cover element.

LIST OF REFERENCE SIGNS 1 speaker assembly
2 PCB
2.1 upper surface
3 speaker
3.1 outer rim
3.2 underside
3.3 contact element
4 cover
4.1 receiving section
4.2 top section
4.3 sidewall section
4.4 through-hole
4.5 retainer element
4.6 lower surface
4.7 upper surface
4.10 cavity
5 mounting element
5.1 collar section
5.2, 5.3 inner flange
5.4, 5.5 outer flange
5.6 lower edge
5.7 guide section
6 coil spring
7 metal disc
8 sub-assembly
V vertical direction

We claim:

1. A speaker assembly comprising:
a base element having a surface that is at least partially electrically conductive;
a speaker cooperating with the surface of the base element for its connection;
a cover element at least partially covering the base element and comprising a receiving section in which the speaker is at least partially received;
a rubber-elastic mounting element interposed between the speaker and the cover element for retaining the speaker in the receiving section, the rubber-elastic mounting element including a collar section circumferentially disposed around the speaker and at least two inner flanges projected inwards from the collar section, an outer rim of the speaker received between a first inner flange of the at least two inner flanges and a second inner flange of the at least two inner flanges; and
at least one connector element electrically connecting the speaker with the base element, the at least one connector element preloaded between the speaker and the base element such that the preload of the at least one connector element originates from a force between the base element and the cover element created from an assembling of the speaker assembly and maintains an electrical connection between the speaker and the base element without a permanent electrical connection between the speaker and the base element.

2. The speaker assembly according to claim 1, wherein said at least one connector element is a spring that is elastically deformed between the speaker and the base element.

3. The speaker assembly according to claim 2, wherein said at least one connector element is a coil spring.

4. The speaker assembly according to claim 1, wherein said rubber-elastic mounting element form-fittingly engages said speaker and the cover element.

5. The speaker assembly according to claim 1, wherein the receiving section comprises a sidewall section that is at least partially disposed laterally of the speaker, said sidewall section being closed at one end by an end section and open at another end towards the base element.

6. The speaker assembly according to claim 1, wherein said rubber-elastic mounting element comprises at least one guide section for guiding the at least one connector element, wherein the at least one guide section extends from a proximity of the speaker towards the base element.

7. The speaker assembly according to claim 6, wherein said at least one guide section is tubular and said at least one connector element is received in the at least one guide section.

8. The speaker assembly according to claim 1, wherein a shape of the collar section corresponds to a shape of the speaker or a shape of the receiving section.

9. The speaker assembly according to claim 1, wherein the at least two inner flanges of the rubber-elastic mounting element are configured to provide a form-fitting connection with the speaker.

10. The speaker assembly according to claim 1, wherein the rubber-elastic mounting element comprises at least one annular outer flange projecting outwards from the collar section and sealingly engaging a sidewall section.

11. The speaker assembly according to claim 1, wherein a cover comprises at least one projecting retainer element that form-fittingly engages the rubber-elastic mounting element.

12. The speaker assembly according to the claim 11, wherein the rubber-elastic mounting element is form-fittingly held between an end section and at least one retainer element.

13. The speaker assembly according to claim 1, wherein the speaker has a circular shape and comprises at least one contact element in electrical contact with a connector element, wherein said contact element form-fittingly engages the rubber-elastic mounting element to prevent rotation of the speaker with respect to the rubber-elastic mounting element.

14. The speaker assembly according to claim 1, wherein at least one conductive buffer element is disposed between a connector element and a conductor path of the base element.

15. A method for assembling a speaker assembly, comprising the following steps:
    providing a base element having a surface that is at least partially electrically conductive, a cover element, a speaker, a rubber-elastic mounting element and at least one connector element;
    assembling the cover element, the rubber-elastic mounting element and the speaker to form a sub-assembly so that the speaker is at least partially received in a receiving section of the cover element and the rubber-elastic mounting element is interposed between the speaker and the cover element for retaining the speaker in the receiving section, the rubber-elastic mounting element including a collar section circumferentially disposed around the speaker and at least two inner flanges projected inwards from the collar section, an outer rim of the speaker received between a first inner flange of the at least two inner flanges and a second inner flange of the at least two inner flanges; and
    assembling the sub-assembly, the at least one connector element and the base element so that the speaker is disposed above the base element, the cover element at least partially covers the base element from above and the at least one connector element is preloaded between the speaker and the base element such that the at least one connector element electrically connects the speaker and the base element, respectively, and maintains an electrical connection between the speaker and the base element without a permanent electrical connection between the speaker and the base element.

16. The method according to claim 15, wherein said at least one connector element is a spring that is elastically deformed between the speaker and the base element.

17. The method according to claim 16, wherein said at least one connector element is a coil spring.

18. The method according claim 15, wherein said rubber-elastic mounting element form-fittingly engages said speaker and the cover element.

19. The method according to claim 15, wherein the receiving section comprises a sidewall section that is at least partially disposed laterally of the speaker, said sidewall section being closed at one end by an end section and open at another end towards the base element.

20. The method according to claim 15, wherein said rubber-elastic mounting element comprises at least one guide section for guiding the at least one connector element, wherein the at least one guide section extends from a proximity of the speaker towards the base element.

* * * * *